United States Patent [19] [11] 4,101,892
Alford [45] Jul. 18, 1978

[54] LOCALIZER ANTENNA ARRAY FOR USE WITH LOCALIZER TRANSMITTERS OPERATING AT ONE CARRIER FREQUENCY

[76] Inventor: Andrew Alford, 71 Bacon St., Winchester, Mass. 01890

[21] Appl. No.: 633,457

[22] Filed: Nov. 19, 1975

[51] Int. Cl.² .............................................. G01S 1/16
[52] U.S. Cl. ................................ 343/108 R; 343/109; 343/853
[58] Field of Search ................. 343/108 R, 109, 853

[56] References Cited
U.S. PATENT DOCUMENTS 3,711,857 1/1973 Cummings ........................... 343/109
3,866,228 2/1975 Alford ............................... 343/108 R Primary Examiner—Maynard R. Wilbur
Assistant Examiner—Richard E. Berger

[57] ABSTRACT

A broadband localizer antenna array with an even number of elements is supplied by a backmatched power dividing network comprising two chains of directional couplers and a group of hybrids which divide the power among the elements in accordance with geometrical progessions. The center elements in the array may be spaced 0.6 wavelength apart at the average frequency. Other spacings between the elements are greater than 0.6 wavelength.

12 Claims, 11 Drawing Figures

LOCALIZER ANTENNA ARRAY FOR USE WITH LOCALIZER TRANSMITTERS OPERATING AT ONE CARRIER FREQUENCY

This invention relates to antenna arrays for instrument landing localizers used to assist in making safe landings by aircraft in inclement weather. In particular, the invention relates to antenna arrays comprising a plurality of individual radiating elements which radiate in the horizontal plane dumbell like patterns with equal or unequal fore and aft lobes, such as, for example, V-ring antenna elements or dipoles with, say, reflectors consisting of one or several parallel rods.

Arrays consisting of 15 V-ring elements have become well known in the art because a large number of them are presently in use. These arrays have several shortcomings which limit their performance and increase their cost. They are difficult to tune a desired frequency because of large coupling between the three central elements. This difficulty is complicated by the fact that the impedances seen looking back into the power distribution network are not matched so the lengths of the cables between the distribution network and the elements determine the impedances of the elements presented to the induced voltages. The result is that the cable lengths must be patiently adjusted to obtain the best compromise between the desired phases and magnitudes of the currents. Such adjustments often result in so called marginal "clearances," that is, in marginal values of the ratio between the 90 and 150 Hz sidebands, particularly when a relatively wide course width is required for use with a shorter runway.

The tuning of the V-ring array usually had to be repeated when the operating frequency was changed, or when the array was moved to another location. It was therefore not possible to manufacture such arrays and make all of the necessary adjustments at the factory and then just install them without regard as to which frequency in the localizer frequency range may be assigned to a particular localizer array. The tuning which often required cutting of cable lengths, other adjustments, ground field measurements and flight tests obviously also required technically competent and experienced crews.

The localizer array system of this invention is broadband in the sense that it works substantially equally well within the present localizer frequency band 108-112 MHz without requiring retuning. The lengths of the feeders used between the antenna elements and the power distribution network are preferably made equal and they are not critical. These lengths need not be varied to control the coupling between the antenna elements. This result is achieved by using, in combination, an even number of antenna elements in the array with two central antennas spaced substantially 0.6 wavelengths apart, with all other spacings between the elements being 0.75 wavelengths and a power distribution network which presents substantially matched impedances to the antenna element feeders. I have used this same combination of spacings and a back matched power dividing network in connection with the traveling wave antenna elements between which the coupling is so low that spacings much smaller than 0.6 wavelength could have been used and the back matching of the power dividing network was not really necessary. In arrays comprising elements such as V-rings or dipoles between which coupling is relatively large, this combination of an even number of elements with the two center elements spaced substantially 0.6 wavelengths, together with a back matched power distribution network is necessary but is not sufficient to achieve a practical, economical localizer array delivering a high degree of performance. To do this it is further necessary to have the right power distribution among the elements of the array.

There are two power distributions; the distribution of the carrier with 90 and 150 Hz sidebands (CS) and the distribution of the 90 and 150 Hz sidebands only (SO). These distributions should be handled separately. Since the horizontal (SO) pattern is anti-symmetric, with zero radiation along the course, the current distribution in SO on the two sides of the course are identical except for 180° phase difference between them. It follows that in an array of 2N elements there are only N different values of SO current and, if one of these is adjusted equal to unit value there remain only (N−1) current values that can be selected. For example, in an eight element array only 3 values can be selected to make the horizontal SO pattern conform to the desired shape. With this small number of available parameters only a relatively crude approximation to the desired pattern can be achieved. A 12 element array has five such parameters. This number of parameters is sufficient to obtain a better approximation to the desired pattern. A number of elements greater than 12 improves the pattern sufficiently to justify the added expense of additional elements and of the parts that go with each added element in some cases. The CS pattern is symmetrical with respect to the course line. In this case also, only the values of (N−1) 5 CS currents can be chosen.

The desired patterns are based on two factors: The ICAO specifications for a single frequency localizer and on the effects of reflections from hangars from other buildings and from large aircraft on taxiways. The ICAO Annex 10 Specification requires that the localizer provide guidance within the 70° sector centered on the runway. It also prescribes a signal strength within the central 20° region of the 70° sector and a lower signal strength within the outer portions of the 70° sector, that is in the regions +10° to +35° and −10° to −35°. The possibility of reflections from hangars, buildings, etc., already in place or that may be added in the future make it important to substantially reduce the SO signal outside the central ±10° sector and to continue this reduction as rapidly as practicable outside the 70° sector.

On each side of the course the SO pattern may be divided into three regions. The "linear region" where the signal increases almost linearly with the angle from the course. A peak region where the signal varies relatively slowly and the fall-off region where the signal should decrease with the increasing angle from the course to a value at 35° and at this be still sufficient to satisfy the ICAO Specification when the transmitter is operated at the design power. A sudden downward step in SO and in CS signal strengths just above 10° is neither necessary nor is it possible to achieve with the few parameters that can be varied in an array with, say, 12 elements. An approximation to fall-off in the signal at 10° is, however, desirable and practicable.

In order to obtain the required meter indications in the aircraft it is necessary that the difference in the depth of modulation by 90 and 150 Hz, usually referred to as DDM, be high, preferably over 0.2 everywhere within the ±35° sector, except in the vicinity of the course. On the course itself the DDM is zero. The high values of DDM are obtained when the CS pattern follows the SO pattern. It is desirable to have two related families of current distributions, one for CS and another for the SO such that they result in suitable pairs of matched CS and SO patterns which follow each other except in the narrow sectors on each side of the course.

The CS group of current distributions for a single frequency self clearing array of $2n$ elements may be described as follows: Let the current in the first element to the right of the center of the array have a unit value. Let the current in the second element have a value of $q$ which is less than unity. Let the current in the third element be $q^2$, in the fourth element be $q^3$ and in $n^{th}$ element be $q^{n-1}$. I find that the general shape of the CS pattern is determined primarily by the value of $q$. The size of the undesirable ripple which is superposed on the pattern is determined by the value of $n$. Furthermore, the larger is the value of $q$ the faster does the signal fall off with the increasing $q$ and the larger is the ripple amplitude for a given value of $n$.

As the number of array elements is increased, the ripple decreases. For an array of 12 elements a value of $q = 0.75$ results in excessive ripple. The values of $q$ less than 0.3 require large values of SO which result in increased likelihood of large course bends due to reflections. The most desirable value of $q$ depends to some degree on the power delivered by the transmitter to the antenna. With 10 watts delivered to a 12 element array with $q = 0.6$ would give good results. The preferred values of $q$ for a 12 element array are between 0.4 and 0.65.

The SO group of the two related families of current distributions which result in useful SO patterns may be described as follows: Let the SO current be equal to unity in the first element to the right of the center of the array. Let the current in the second element be P. Let the current in the third element be P.Q. Let the SO current in the fourth element be P. $Q^2$ and in $n$th element be P. $Q^{n-2}$. In this case there are two parameters: P and Q. When $P = 1$ one gets a group of SO distributions which depend only on the value of Q. The more useful values of $Q$ are between $Q = 0.80$ and $Q = 0.5$.

The main effect of changing the value of P from $P = 1$, to $P = 0.9$ and $q = 0.7$ is to lower the SO curve by about 30% between 35° and 60° without much change in the overall shape of the curve or in the size of ripple.

The SO distribution obtained with P = 1 and Q = 0.7 results in the SO pattern which from about 10° up to about 70° follows closely the CS pattern obtained with value of between 0.5 and 0.6 when the course width is 6° and still satisfactory with 4° course width. When it is desired to use mostly course widths much narrower than 6°, for example, 3.5°, the CS pattern with a value of $q$ closer to $q = 0.5$ with the SO pattern corresponding to $Q = 0.6$ or a CS pattern with $q = 0.60$ and SO $Q = 0.7$ may be used as suitable pairs. When making a choice among such pairs it is well to keep in mind that the power gain of the array is increased when a CS pattern corresponding to a large value of $q$ is selected. This effect tends to make up for some of the decrease of CS signal obtained at, say, 10° with larger values of $q$.

The undesirable increase in the SO signal between 65° and 90° from the course which appears in the patterns calculated on the basis of omnidirectional elements is usually of little practical importance because with elements like V-rings or dipoles which radiate relatively little signal at angles between 65° and 90° measured in either direction from the front course or from the back course.

One objective of this invention is to devise a multi-element localizer arrays of radiators with dumbell-like horizontal patterns with equal or unequal major lobes, requiring no field adjustments when the transmitter is retuned from one frequency to another frequency in the localizer band 108-112 MHz.

Another objective of my invention is to devise localizer arrays which produce adequate signals for guidance of aircraft within more than the ±35° sectors from the course and yet produce relatively very small SO signals outside of the ± sector thus reducing the undesirable reflected signals from hangars and other airport structures.

Still another object of my invention is to devise a family of localizer antenna arrays with an even number of elements that are particularly suited for use with a transmitter operating at one frequency.

Other objects, features and advantages of the present invention will be apparent from the following description of an embodiment of the invention which represents the best known use of the invention. This embodiment is shown in the accompanying drawings in which.

Figure 1:
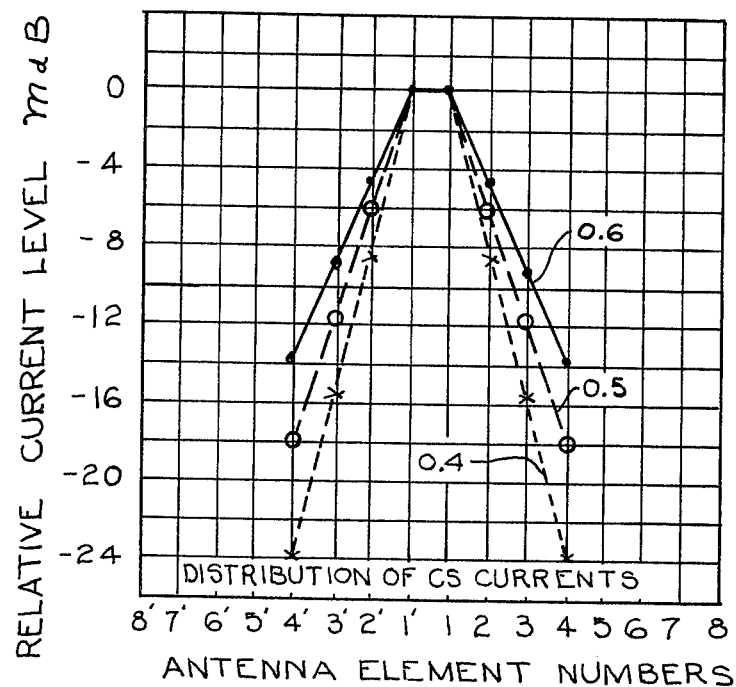
FIG. 1 shows a group of CS current distributions obtained with various values of parameter $q$ of this invention.

In FIG. 1 is plotted a group of geometric CS current distributions among the elements. For convenience only currents in the first four elements on each side of the array center are shown. The radiating elements to the right of the center are designated by numerals 1, 2, 3, 4, ... $n$. The radiating to the left of the center are designated by primed numerals 1', 2', 3', 4', ... $n'$. The total even number of radiating elements is $2n$. Each dot, circle, etc., in the diagram indicates the magnitude of the current in a particular distribution. To avoid clutter only four elements are shown on each side of the center but the diagram can obviously be extended to show a larger number of elements. Straight lines which connect groups of dots, circles, etc., are used to emphasize the relations between the corresponding current magnitudes indicated by the same characters such as dots, circles, etc. Each straight line is labeled with a fractional number, for exmple, line 2 is also labeled 0.5 which indicates that the series of current magnitudes corresponding to line 2 in the diagram may be calculated from the geometrical progression 1, 0.5, $(0.5)^2$, $(0.5)^3$. In the diagram of the magnitudes of the currents ae expressed in terms levels in decibels (dB). They form an arithmetic progression 0, −6, −12, −18, ... $d$B. A plot of numbers in an arihemtic progression is a diagram such as is shown in FIG. 1, is a straight line.

There is a straight line for every different value of fraction $q$. For example, there are straight lines for $q = 0.4$, $q = 0.5$, $q = 0.6$, ... Each different value of $q$ also corresponds to a different CS pattern.

Figure 2:
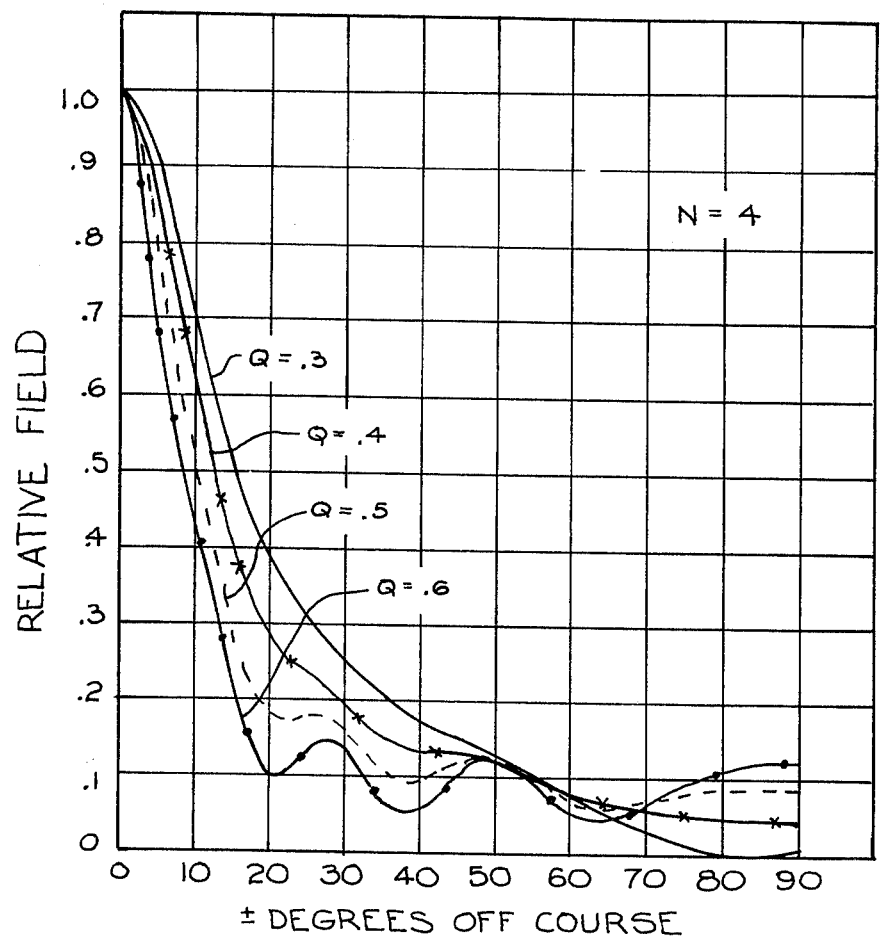
FIG. 2 shows the CS pattern for an array with eight omnidirectional elements and the current distributions of FIG. 1.
Figure 3:
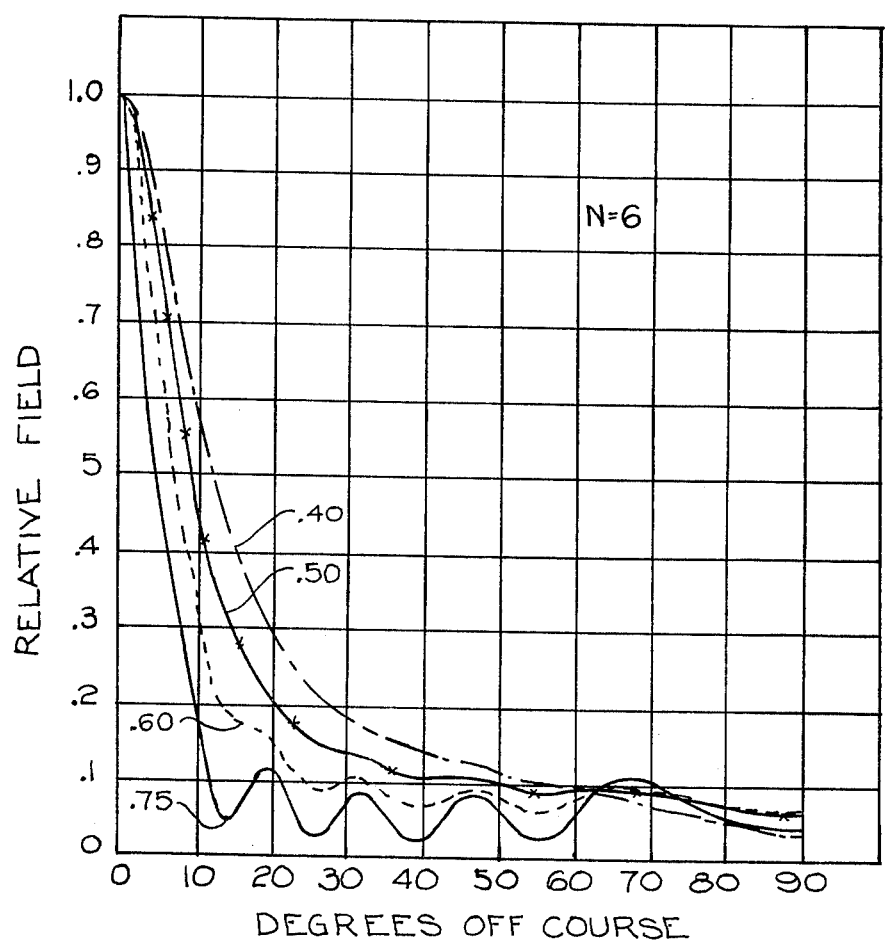
FIG. 3 shows the CS patterns of a 12 element array with omnidirectional radiators obtained with CS current distributions in accordance with FIG. 1 for different values of parameter $q$.
Figure 4:
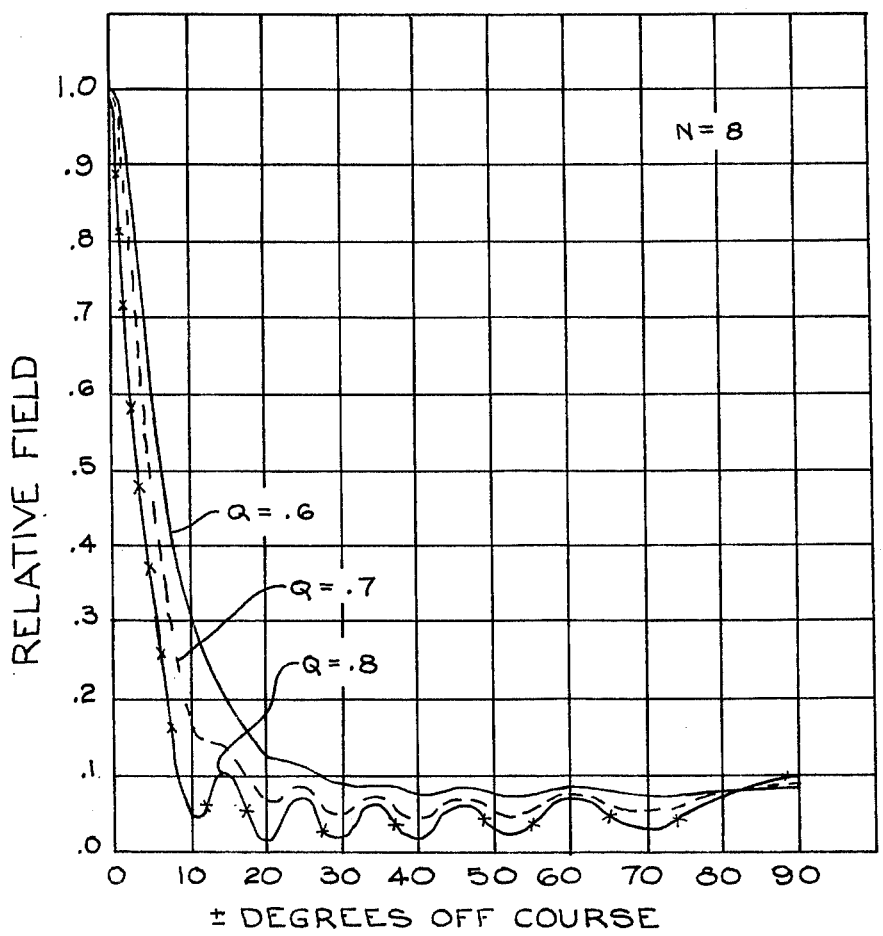
FIG. 4 shows a group of CS patterns obtained with a 16 element array using the current distributions of FIG. 1 and omnidirectional elements.

The CS pattern which correspond to geometric current distributions can be determined by calculation or by measurement. The CS measured patterns of arrays with even numbers of elements and with the central elements spaced substantially 0.6 wavelengths at the average frequency within the band and having other elements at distances greater than 0.60 of the wavelength follow closely the calculated patterns. This fact results in a great saving of time and expense because the calculations can be carried much faster and less expensively than pattern measurements. The following relatively simple equation gives the values of CS signal at various angles from the course.

$$CS = \frac{1-q}{1-q^N}\left[\frac{\cos\gamma - q\cos(\gamma-\beta)}{1+q^2-2q\cos\beta} + q^N \cdot \frac{-\cos(\gamma+N\beta)+q\cos[\gamma+(N+1)\beta]}{1+q^2-2q\cos\beta}\right]$$

where $\gamma = \frac{2\pi}{\lambda} \cdot b \cdot \sin\theta$; $\beta = \frac{2\pi}{\lambda} \cdot a \cdot \sin\theta$ $\lambda$ = wavelength; $b = 0.3\lambda$; $a = 0.75\lambda$ $\theta$ = the angle from the course as measured at the center of the array. In the expression on the right hand side of the equation $(1 - q/1 - q^N)$ is a normalizing factor which makes CS equal to 1.0 at $\theta = 0$. The first fraction in the braces is the principal term. This term is independent of the value of $n$. The second term in the braces is the ripple term. Its effect is to superpose a ripple on the curve given by the first term. For a given value of $q$ the CS pattern has the same general shape regardless of the number of elements in an array. With a larger number of elements in an array, however, it is practicable to use a larger value of $q$ because for a given value of $q$ the ripple decreases as the number of elements increases. FIGS. 2, 3 and 4 show CS patterns respectively 8, 12, 16 element arrays having the current distributions in accordance with FIG. 1.

Figure 5:
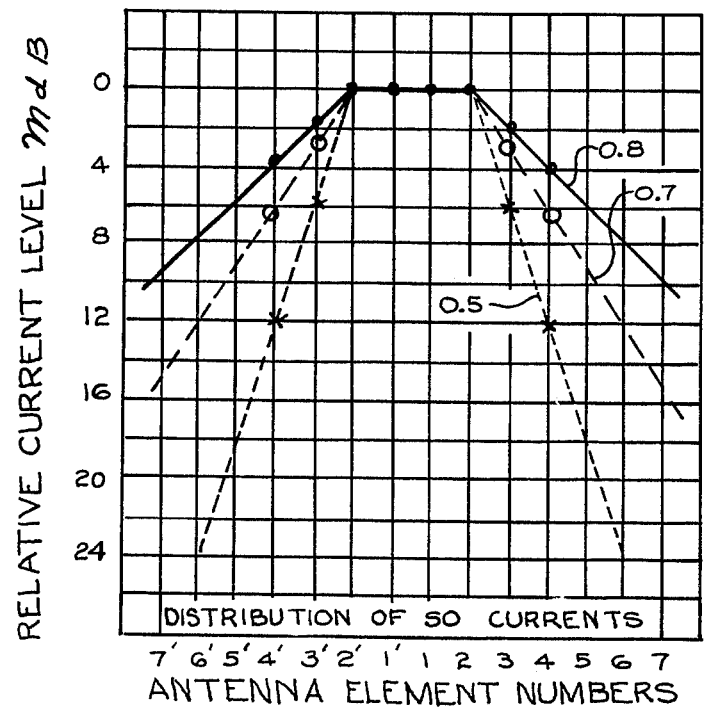
FIG. 5 shows a group of SO current distributions various values of parameter Q in accordance with one embodiment of the invention.

The SO current distributions in accordance with this invention are shown in FIG. 5. The numeration of the elements in the array is the same as in FIG. 1. To the right of the array center the elements are numbered 1, 2, 3, ... $n$. to the left of the array center the elements are numbered 1', 2', 3', ... $n'$. The magnitudes of the currents are plotted in terms of dB below a zero level. The four magnitudes of the currents in the four central elements are equal and are shown to be at zero level. The currents in elements 3, 4, 5, ... $n$ and in 3', 4', 5', ... $n$ have magnitudes decreasing in accordance with geometrical progressions with different ratios Q. For example, if currents in elements 1, 2 have magnitudes equal to unity the magnitudes of the currents in elements 3, 4, .. . $n$ and in elements 3', 4' are respectively $Q, Q^2 \ldots Q^{n-2}$.

The SO patterns can also be easily calculated with aid of a relatively simple equation:

$$SO = \sin\gamma + \frac{\sin(\gamma+\beta) - Q\sin\gamma}{1+Q^2 - 2Q\cos\beta} - \frac{Q^{N-1}[\sin(\gamma+N\beta) - Q\sin[(N-1)\beta+\gamma]]}{1+Q^2-2Q\cos\beta}$$

where $\beta$ and $\gamma$ have the same values as in the equation given here for the CS. The value Q need not be the same as $q$ used in CS. The values of $q$ and Q should be selected so that one obtains the most suitable pairs of CS and SO distributions.

When one is making a choice of suitable pairs of CS and SO distributions the following factors should be kept in mind. The value of the ratio $u$ = SO/CS should not exceed 4.0 because larger values of $u$ result in overmodulation which should be avoided when possible, although normally does not result in wrong indications in aircraft receivers. The value of $u = 0.5$ corresponds to DDM = 0.200. Value $u$ greater than 0.5 result in values of DDM above 0.200. It follows from this that except in the vicinity of the course the value of $u$ should preferably be kept between 0.5 and 4.0.

Figure 6:
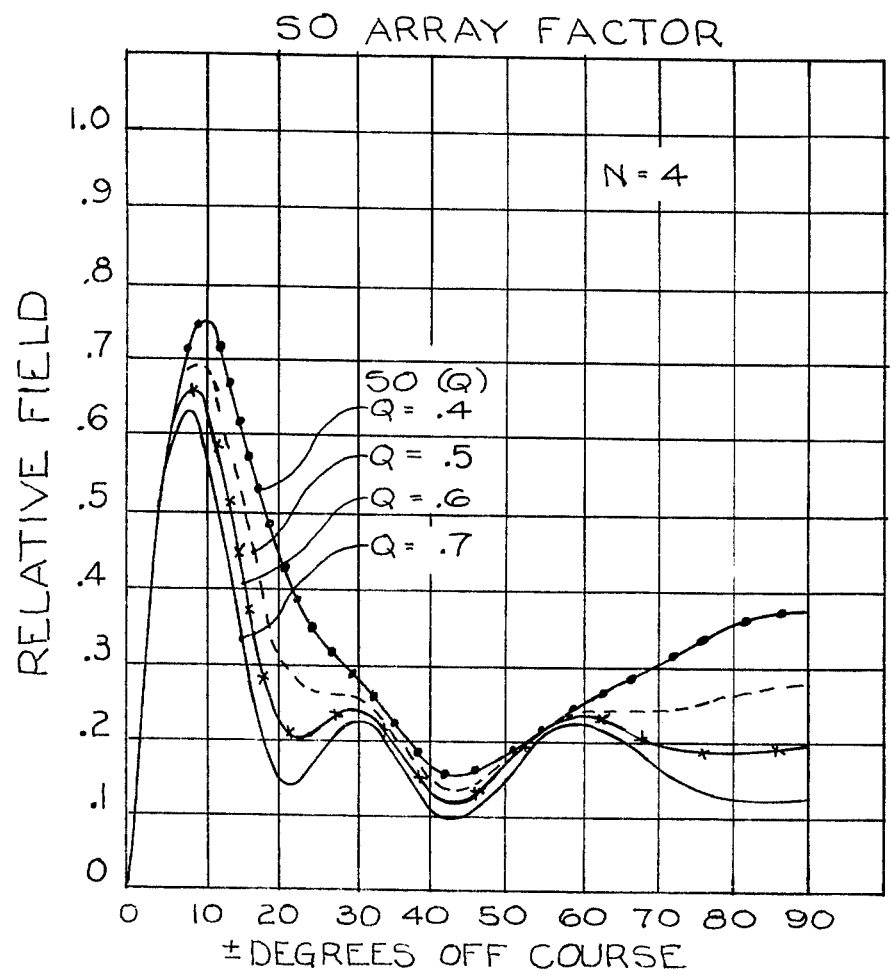
FIG. 6 shows a group of SO patterns of a four element array with omnidirectional radiators using SO current distributions of FIG. 5.
Figure 7:
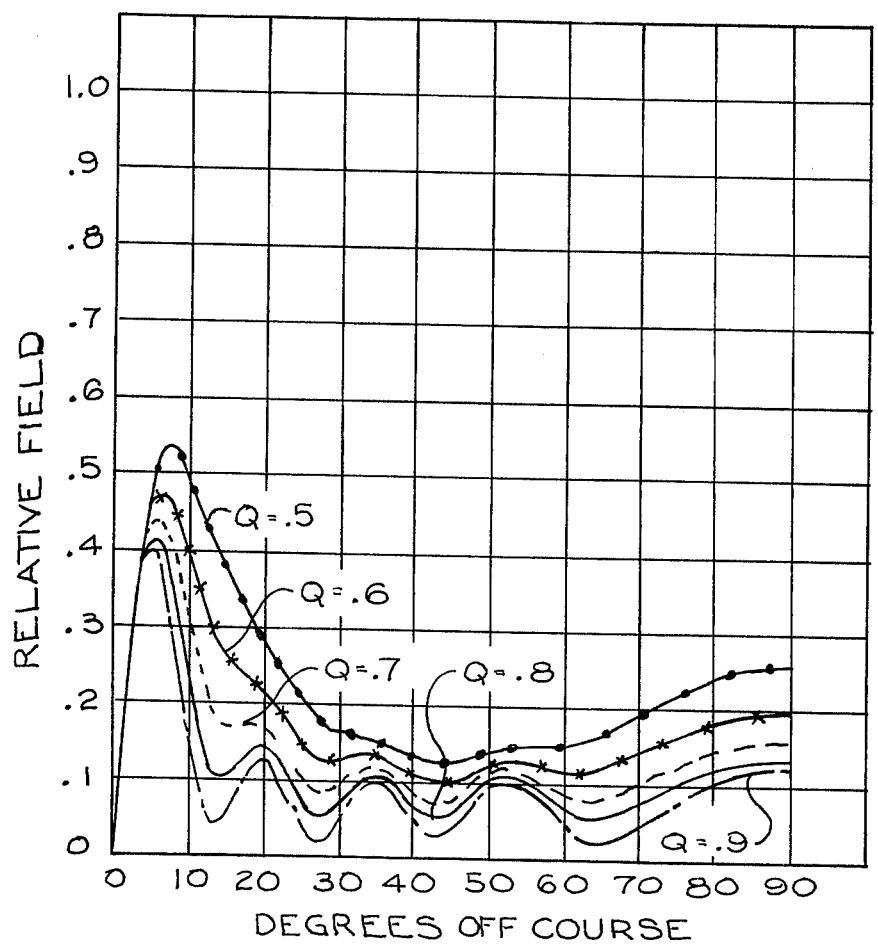
FIG. 7 shows a group of CS patterns obtained with an array of 12 omnidirectional elements using the CS current distributions of FIG. 1.
Figure 8:
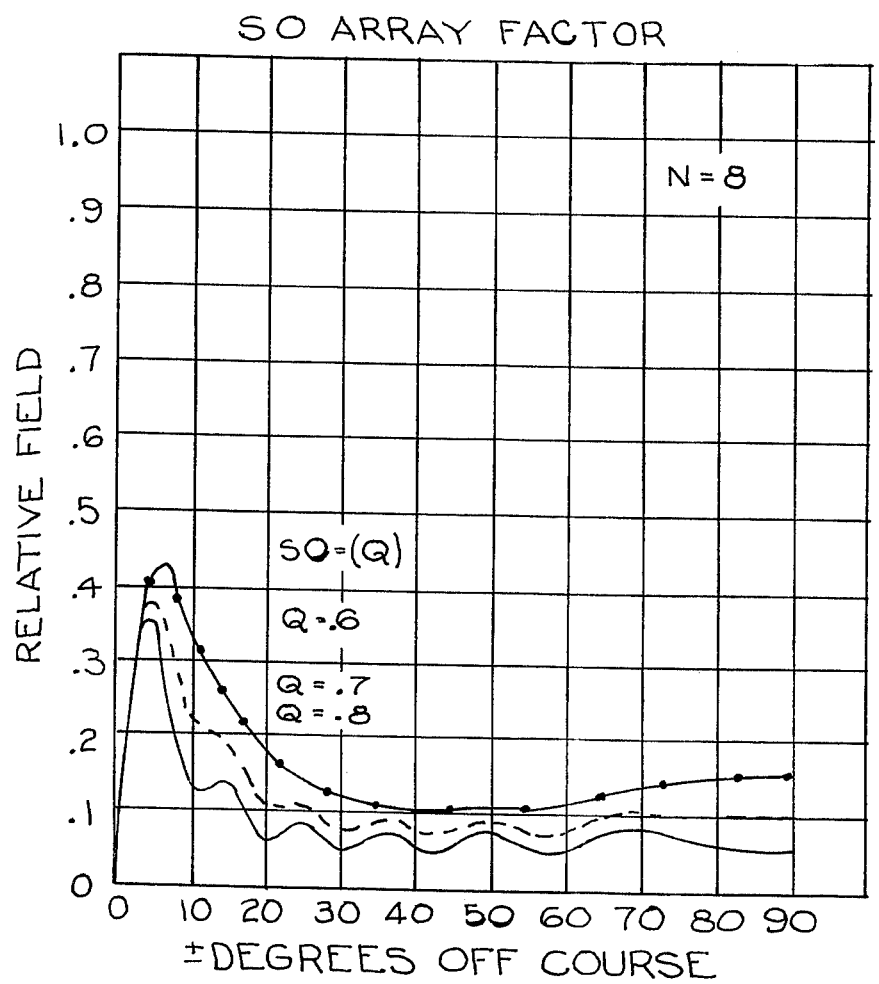
FIG. 8 shows the SO patterns obtained with a 12 element array having omnidirectional elements and the SO current distributions of FIG. 5.
Figure 9:
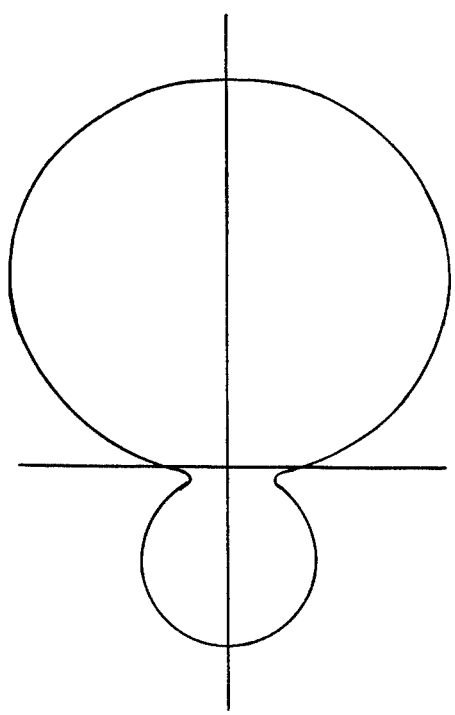
FIG. 9 shows the horizontal patterns of a V-ring element.

The SO pattern plotted in FIGS. 6, 7 and 8 are normalized for the course width of 6°. The magnitudes of the SO currents with respect to the CS currents are approximately in inverse proportion to the course width. It is helpful to make use of this fact in making the choice of suitable pairs. For example, suppose it is desired to make a choice of a suitable pair of CS and SO patterns for operation at 4° course width. One may multiply the ordinates of the SO patterns normalized for 6° by the factor 6/4 = 1.5 and then compare the resulting set with the CS pattern.

Figure 10:
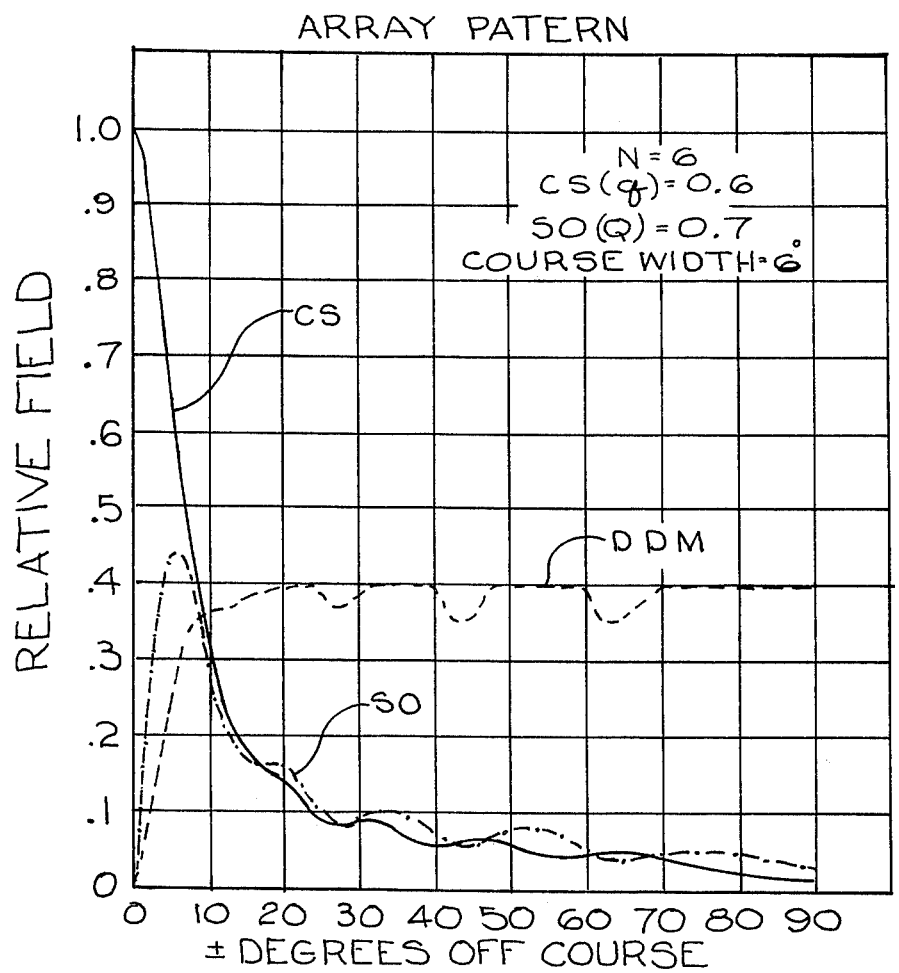
FIG. 10 shows the CS, SO and DDM patterns of a 12 array with V-ring elements and geometric distributions with $q = 0.6$, $Q = 0.7$ and 6° course width.

When directional elements are used both the CS and SO patterns are multiplied by the horizontal patterns of such elements. FIG. 10 shows the horizontal pattern of a V-ring element. The horizontal pattern of a dipole with a reflector comprising two rods is similar to that of a V-ring element but is somewhat narrower and the back lobe is smaller.

Figure 11:
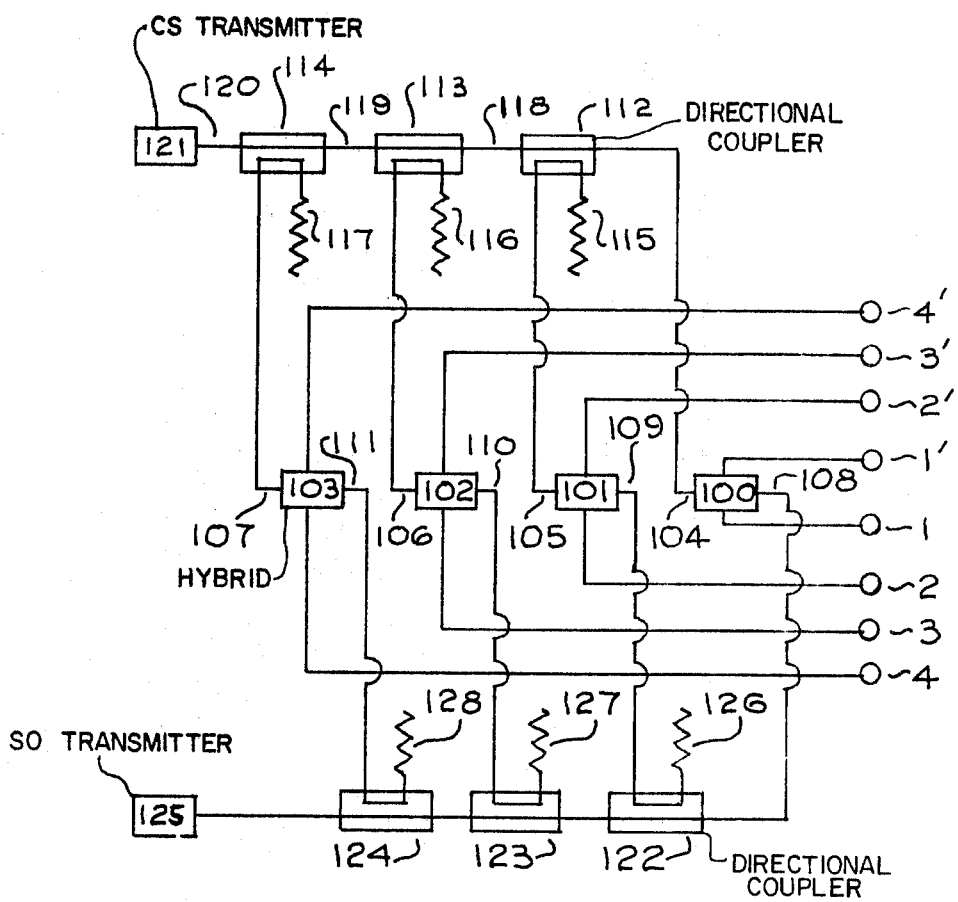
FIG. 11 shows a power distribution network which may be used for energizing arrays with geometric distributions.

The effects of the V-ring pattern on CS and SO patterns of a 12 element array with geometric current distributions corresponding to CS $q = 0.6$, SO $Q = 0.7$ and 6° course width may be seen from FIG. 11.

A typical power distribution network for geometric distributions may be of type shown in FIG. 11 which shows a distribution network for an 8 element array. In this figure 100, 101, 102 etc. are 180° hybrids, the output ports of which, 90 thru 97, are connected to the antenna elements 1, 1', 2, 2', ... on opposite sides of the center of the array. For example, hybrid 100 is connected to elements 1 and 1', hybrid 101 is connected to elements 2 and 2', etc. The CS power is delivered in proper proportions to the sum ports 104, 105, 106, 107 of hybrids 100, 101, 102, 103. The SO power is delivered to the difference ports 108, 109, 110, 111 of hybrids 100, 101, 102, 103. The so called 3 dB couplers may be used in place of the hybrids. While the network shown is for eight elements it may be easily extended to supply 2 $n$ elements.

There are two coupler chains, one for CS signal and another for the SO signal. The CS coupler chain comprises $(n-1)$ couplers when the number of elements in the array is $2n$. Three CS couplers are used in a distribution network for an eight element array. In FIG. 11 numerals 112, 113, 114 identify the three CS directional couplers. Matched terminations 115, 116, 117, are used to terminate CS couplers 112, 113, 114. The three couplers 112, 113, 114 comprise the CS coupler chain for the eight element array.

Let it be assumed that the power supplied to the far end of the chain, in this case to port 104 of hybrid 100 is 1.0 (one unit). Then in accordance with the geometric distribution the power supplied to port 104 of hybrid 101 is $q^2$. It follows that the power delivered to port 118 of coupler 112 is $1 + q^2$ so that the coupling coefficient of this coupler should be $(q^2/1 + q^2)$ By similar reasoning it is found that the coupling coefficients of the couplers 113 and 114 are respectively $(q^4/1 + q^2 + q^4)$, $(q^6/1 + q^2 + q^4 + q^6)$. The total power supplied by the CS transmitter 121 is $1 + q^2 + q^4 + q^6$.

The SO chain of directional couplers is similar to the CS chain. This SO chain comprises the directional couplers 122, 123 and 124. In order to get the geometric distribution of the SO type port 109 of hybrid 101 should receive the same power as port 108 of coupler 100. This can be achieved by making the power coupling coefficient equal to 1/2, that is, by making coupler 122 a so called 3 dB coupler. Such a coupler could be replaced, if desired, by a 180° hybrid in which the power is delivered to the sum port′, the diference port is terminated into a resistor. The side ports are connected to ports 108, 109 of hybrids 100, 101.

The coupling coefficient of the second SO coupler, coupler 123, is $Q^2$. The coupling coefficient of the third SO coupler should be $(Q^4/2 + Q^2$ and so on. The total power supplied to the SO chain by the SO transmitter 125 is $2 + Q^2 + q^4$. In the general case of $2n$ element array the total power is $(2 + Q^2 + Q^4 + \ldots Q^{2n-4})$.

The network of FIG. 11 is such that should one desire to add another pair of elements to array, the network can be expanded by adding another 180° hybrid and by inserting an additional coupler into the line between the CS transmitter 121 and port 120 of coupler 114 in the CS line and performing a similar addition of another coupler between the SO transmitter 125 and coupler 124 in the SO line. It may be advantageous to add just the SO coupler and not the CS coupler when another pair of elements is added to decrease the ripple in the SO pattern. When CS coupler is not added a matched termination should be connected to the sum input of the added 180° hybrid.

The network of FIG. 11 has two very desirable properties:
(1) It is back matched, that is if one were to measure the impedance looking into the line supplying any element, it is found that the line is matched.
(2) If one measures the degree of isolation between two lines feeding two elements it is found that the isolation is high, typically in a carefully built network such isolation will measure well over 25 dB.

Having described geometric current distributions, the array patterns obtained with these distributions and the power dividing network which may be used to obtain the current distributions, it is well to consider the question as to how strictly should one conform the geometric distributions? This question is difficult to answer because of a large number of parameters involved and because pattern distortion is a matter of degree. Practical experience shows that $\pm 1$ dB deviations in current magnitudes do not produce major distortion of the patterns but that $\pm 2$ dB deviations in a pair of elements can result in an substantial decrease in DDM in one part of a pattern and result in some overmodulation in another part of the pattern.

It will be clear to those versed in the art that directional antennas of types other than cylindrical antennas with slots may be used to achieve similar results, for example, antennas consisting of stacked rings can be used.

I claim:
1. A localizer antenna array comprising:
   (a) an even number of antenna elements,
   (b) a transmitter of the carrier and sidebands,
   (c) power supplied by said transmitter to a group of power dividers,
   (d) a group of hybrids fed by said power dividers distributing the carrier and sidebands power among the antenna elements substantially in accordance with a geometrical progression.
2. A localizer array as in claim 1 wherein the center antenna elements are spaced 0.6 wavelengths apart at the average wavelength in the localizer band and other elements are separated more than 0.6 wavelength from each other.
3. A localizer array as in claim 1 wherein the power division deviates less than $\pm 1\frac{1}{2}$ dB from the geometric progression.
4. A localizer array comprising:
   (a) an even number of antenna elements,
   (b) a transmitter of the sidebands only without carrier,
   (c) power supplied by said transmitter to power dividers,
   (d) a group of hybrids fed by said power dividers distributing the sidebands only power to antenna elements substantially in accordance with a geometrical progression among the antenna elements starting beyond the first two from the center of the array.
5. A localizer array in accordance with claim 4 wherein the two central elements are spaced substantially 0.6 wavelengths apart.
6. A localizer array in accordance with claim 5 wherein the elements other than the central elements are spaced 0.75 wavelength apart at the average wavelength within the localizer band.
7. A localizer array in accordance with claim 1 wherein the number of elements is greater than four.
8. A localizer array in accordance with claim 1 wherein the power dividers are directional couplers.
9. A localizer array in accordance with claim 1 wherein a second set of power dividers in combination with the hybrids distribute the sidebands only power to antenna elements substantially in accordance with a geometrical progression among the antenna elements starting beyond the first two from the center of the array.
10. A localizer array as in claim 4 wherein the power dividers are directional couplers.
11. A localizer array as in claim 4 wherein the power division deviates less than $\pm 1\frac{1}{2}$ dB from the geometric progression.
12. A localizer array as in claim 9 wherein the power division deviates less than $\pm 1\frac{1}{2}$ dB from the geometric progression.

* * * * *